No. 802,555. PATENTED OCT. 24, 1905.
H. H. COLESTOCK.
FILTER.
APPLICATION FILED FEB. 17, 1905.

Witnesses,
W. H. Palmer.
Emily F. Otis.

Inventor,
Harry H. Colestock.
by Lothrop & Johnson
his Attorneys

UNITED STATES PATENT OFFICE.

HARRY H. COLESTOCK, OF ST. PAUL, MINNESOTA, ASSIGNOR TO THE SANITARY WATER FILTER CO., OF ST. PAUL, MINNESOTA, A CORPORATION OF MINNESOTA.

FILTER.

No. 802,555.      Specification of Letters Patent.      Patented Oct. 24, 1905.

Application filed February 17, 1905. Serial No. 246,013.

*To all whom it may concern:*

Be it known that I, HARRY H. COLESTOCK, a citizen of the United States, residing at St. Paul, in the county of Ramsey and State of Minnesota, have invented certain new and useful Improvements in Filters, of which the following is a specification.

My invention relates to improvements in filters designed particularly for attachment to faucets.

Among the objects of my invention is to provide a filter which will be reversible within a part removably supported by the faucet, so that the discharge ends of the filter need not be constructed to engage with the faucet.

A further object is to simplify the construction and arrangement of the filtering-chambers, so that they may be easily and quickly filled and emptied.

Among the other objects is to provide a chamber for catching and retaining the larger particles in the water to prevent their clogging the inlet-openings of the filter and also to provide water-tight joints between the separable parts.

To this end my invention consists in the features of construction and combination hereinafter particularly described and claimed.

Figure 1:
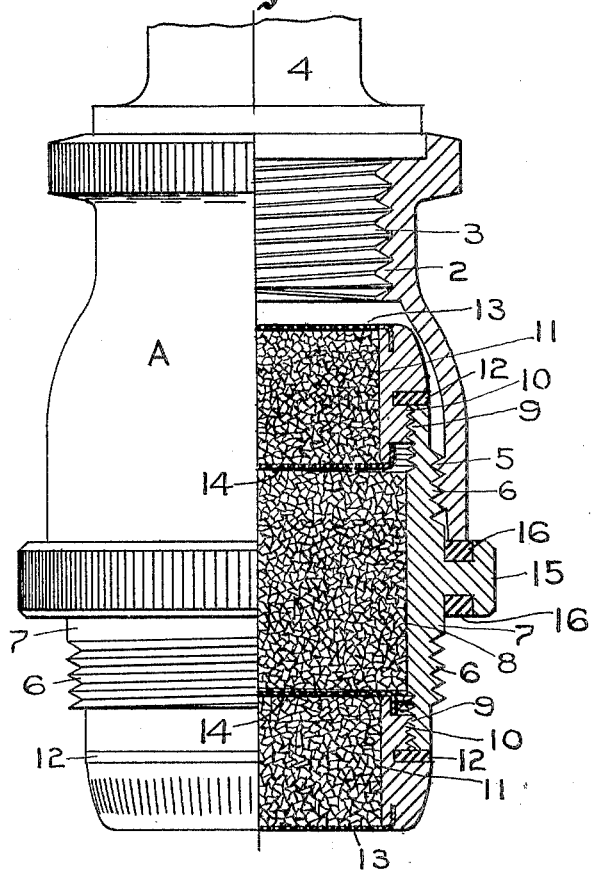
Figure 2:
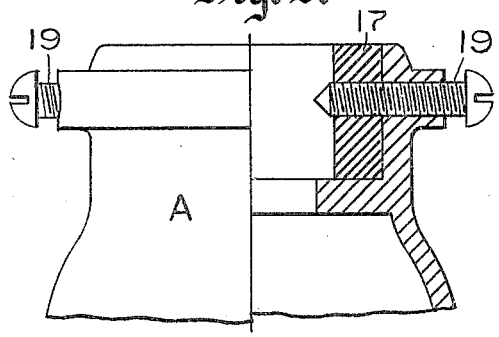

In the accompanying drawings, forming part of this specification, Figure 1 is an elevation of my improved filter, partly in section, and Fig. 2 is a similar view of one end of a modified construction.

In the drawings, A represents a thimble or casing having interior threads 2 at one end to engage with the threads 3 of the faucet 4. The thimble is provided at its other end with interior threads 5 to engage with the threads 6 of the filter-body 7. The filter-body 7 consists of a central hollowed portion 8, forming a chamber to hold suitable filtering material, as carbon. The chamber 8 is formed at each end with interior threads 9 to engage with the threads 10 of a chamber 11, designed to hold quartz or other suitable material. Each chamber 11 is provided with a rubber ring 12, against which the adjacent end of the central chamber of the filter-body contacts. Each chamber is provided with an outer perforated end 13 and an inner removable perforated cover 14. The outer perforated wall of the chamber 11 is preferably cast into the end of the chamber and the end of the chamber tapered, as shown. The filter-body is formed with a central outwardly-extending rib 15, having in each side an inset rubber ring 16, against which the outer end of the thimble 2 is adapted to bear, as shown in Fig. 1, to make a water-tight joint.

In Fig. 2 is shown a modified form of a thimble designed to be supported upon the end of a smooth-surface faucet. To this end a rubber ring 17 is arranged within one end of a modified form of thimble, and screws 19 are threaded through the wall of the thimble and the ring 17 to engage the end of the faucet to hold the thimble thereon. The filtering-body is adapted to be supported within the end of the thimble, as in Fig. 1.

By having the ends of the filter-body and the supported quartz-chambers 11 of restricted diameter and tapered a chamber is formed between the end of the filtering-body and the thimble, into which the larger particles will pass, and thus will not clog the inlet-openings of the quartz-chamber. By having the thimble supported upon the faucet and the filtering-body reversible within the thimble it is possible to have the filtering-body formed with narrowed and tapered ends to concentrate the outflowing streams of water.

Another advantage of having the filter-body reversible within the thimble is that a simpler and more convenient arrangement of filtering-chambers is possible. By unscrewing the quartz-chambers the central chamber of the filter-body may be quickly filled or emptied with carbon or other suitable material, and by removing the inner perforated walls of the quartz-chambers said chambers may also be quickly filled or emptied. By means of the rubber rings 16 a water-tight joint is obtained between the thimble and filter-chamber, and by means of the rubber rings 12 a similar joint is obtained between the quartz-chambers and end of the filter-body. The outer wall of the filter being of perforated metal is much more durable and cleaner than wire-gauze and better insures individual streams of water, which increases the aeration thereof.

Having now described my invention, what I claim as new, and desire to secure by Letters Patent, is—

1. A filter comprising in combination a hollow body, filtering-chambers within said body, an outwardly-extending circumferential rib, a casing having means for removable support at one end upon a faucet and at the other end having means for engagement with said filter-body upon either side of said rib whereby when said casing and filter-body are connected the ends of said casing may contact with said rib.

2. A filter comprising in combination a casing having removable support upon the end of a faucet, a filter-body reversibly supported in one end of said casing, filtering-chambers removably supported in the ends of said body, each of said chambers being narrowed to form a space or chamber between it and the adjacent portion of the casing.

3. A filter comprising a casing having means for removable support at one end upon a faucet, a filter-body reversibly supported in the opposite end of said casing, filtering-chambers removably supported in the ends of said body, a central outwardly-extending circumferential rib carried by said body, and packing-rings inset in the sides of said rib.

4. A filter comprising in combination a casing having means for removable support at one end upon a faucet, a hollowed filter-body reversibly supported in the opposite end of said casing, filtering-chambers removably supported in the ends of said body, and removable inner walls for said chambers.

5. A filter comprising in combination a casing having means at one end for detachable support upon a faucet, a filter-body reversibly supported in the opposite end of said casing, said body being hollowed to form a central chamber, filtering-chambers supported in and closing the ends of said central chamber, and removable walls between said end chambers and said central chamber.

6. A filter comprising in combination a casing having means for detachable support at one end upon a faucet, a filter-body having reversible threaded support in the other end of said casing, said body being hollowed to form a central chamber, filtering-chambers removably threaded in the ends of said central chamber, outer perforated walls for said filtering-chambers, and inner perforated removable walls for said chambers.

In testimony whereof I affix my signature in presence of two witnesses.

HARRY H. COLESTOCK.

Witnesses:
  H. S. JOHNSON,
  EMILY F. OTIS.